United States Patent
Green et al.

(10) Patent No.: US 6,308,429 B1
(45) Date of Patent: Oct. 30, 2001

(54) PORTABLE SEAL GAP GAGE SYSTEM

(75) Inventors: Brian Green, Swartz Creek; Sean Miller, Davison, both of MI (US)

(73) Assignee: Linear Measurement Instruments, Corp., Byron, MI (US)

( * ) Notice: Subject to any disclaimer, the term of this patent is extended or adjusted under 35 U.S.C. 154(b) by 0 days.

(21) Appl. No.: 09/283,782

(22) Filed: Apr. 1, 1999

(51) Int. Cl.[7] ....................................................... G01B 3/38
(52) U.S. Cl. ................................. 33/542; 33/194; 33/608
(58) Field of Search .............................. 33/613, 542, 194, 33/544.5, 546, 600, 608

(56) References Cited

U.S. PATENT DOCUMENTS

| | | |
|---|---|---|
| 3,987,552 | 10/1976 | Raiteri . |
| 4,221,053 | 9/1980 | Bobel et al. . |
| 4,314,406 | 2/1982 | Barnes . |
| 4,345,380 | 8/1982 | Vis . |
| 4,437,241 * | 3/1984 | Lemelson ................................ 33/613 |
| 4,554,742 | 11/1985 | Freitag . |
| 4,606,129 | 8/1986 | Barrowman et al. . |
| 4,640,014 | 2/1987 | Thomas . |
| 4,731,935 | 3/1988 | Struble . |
| 4,787,151 * | 11/1988 | Struble ................................... 33/613 |
| 4,831,741 | 5/1989 | Sogoian . |
| 4,862,598 * | 9/1989 | Barlow et al. ........................ 33/613 |
| 5,067,250 | 11/1991 | Auweiler et al. . |
| 5,492,003 | 2/1996 | D'Anna . |
| 5,551,162 | 9/1996 | Struble . |
| 5,657,550 | 8/1997 | Struble . |
| 5,768,794 | 6/1998 | Kelly . |

* cited by examiner

Primary Examiner—Andrew H. Hirshfeld
(74) Attorney, Agent, or Firm—Howard & Howard

(57) ABSTRACT

A portable gaging system is used to measure a seal gap for a vehicle door or decklid. The gaging system includes gage assemblies that are removably mounted on a door or decklid flange. The gages are spaced apart from one another about the perimeter of the door or decklid to simultaneously measure the seal gap at various locations. A probe member is supported on each of the gaging assemblies and is selectively moveable between a rest position and an actuated position by the vehicle door as the door is moved from an open to a closed position. Each of the gage assemblies has a sensor for producing an electronic signal representative of gap size based upon movement of the probe member. A portable processor unit receives and stores the electronic signals produced by each of the gage assemblies. A remote actuator is used to generate an activation signal to initiate the gap measurements. An adapter assembly can be removably mounted to the gage body to provide extended support for the probe for measuring larger gap sizes.

13 Claims, 8 Drawing Sheets

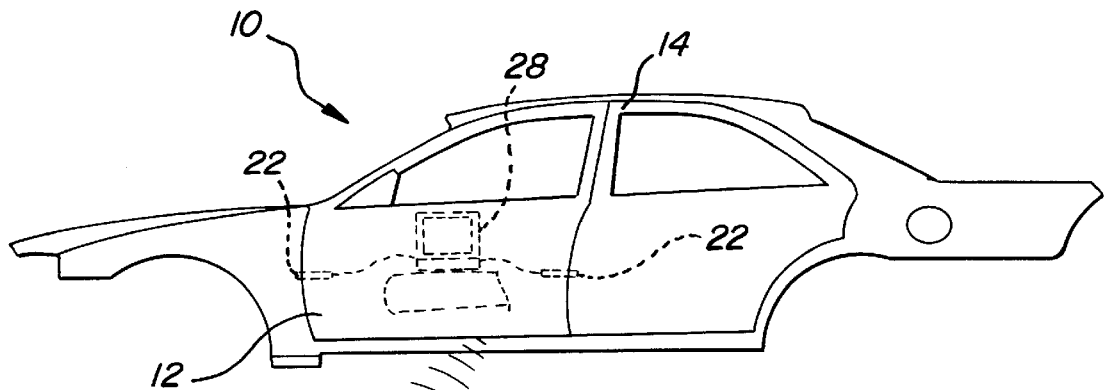
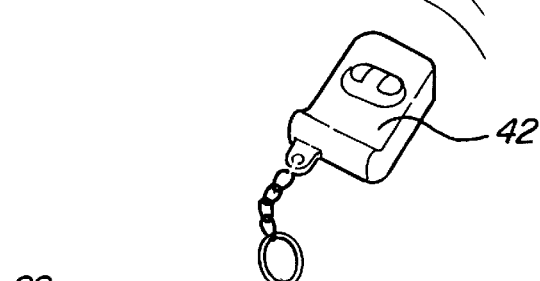
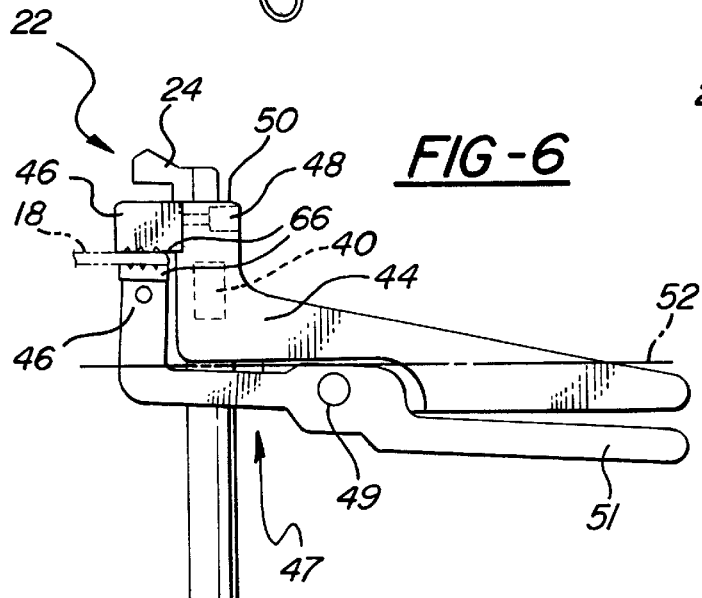
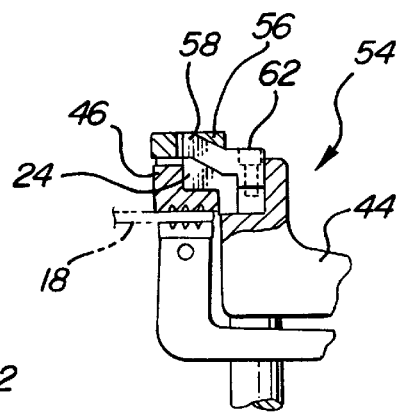
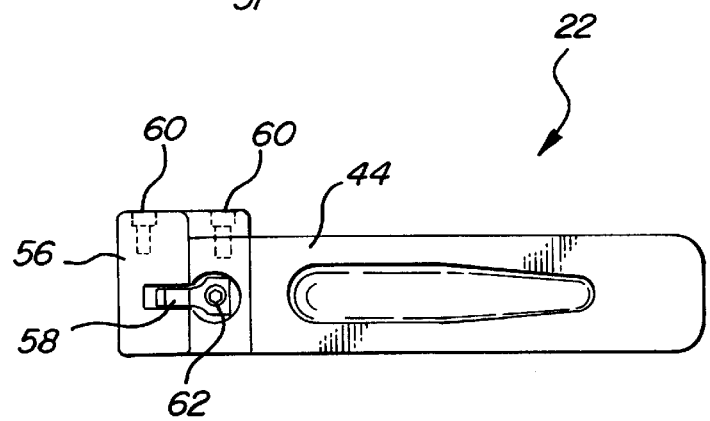
FIG-5
FIG-6
FIG-7
FIG-8

PORTABLE SEAL GAP GAGE SYSTEM

TECHNICAL FIELD

This invention relates generally to a portable seal gap gage system used to simultaneously measure a vehicle door and/or decklid seal gap at various locations. Specifically, a plurality of seal gap gages are mounted to a decklid or door flange at various positions and a remote actuator is used to initiate gap measurement. Each of the gages produces an electronic signal indicative of gap size at the respective location. The electronic signals are received by and stored in a portable processor.

BACKGROUND OF THE INVENTION

It is important to measure the seal gap region between a door or decklid and its respective weld flange. The seal gap measurement is taken to verify that there is proper compression on the seal, when installed, to reduce wind noise and prevent water leakage. The ideal seal gap measurements are intended to be taken when the door is in the closed position with the door or decklid being flush with its respective mating component.

One known system for measuring a seal gap uses gage blocks that are removably mounted to the door flange with positioning screws. The gage block has a pivotable arm with an abutment surface. To take a seal gap measurement, the gage is mounted to the door flange and the arm is pivoted to its fully extended position. The door is then shut, contacting the abutment surface of the arm, causing the arm to pivot toward the gage block. The door is then opened and a probe adapter and transducer assembly are inserted into the gage block to determine the position or displacement of the arm. In order to take multiple measurements at different locations along the weld flange, multiple gage blocks must be mounted to the weld flange at the desired measurement locations. A probe adapter and transducer must then be inserted into each gage block to take the seal gap measurement at this location.

One disadvantage with this system is that it is time consuming to set up. It is also time consuming to take each measurement individually about the door flange. Another disadvantage is inaccuracies in seal gap measurements caused by door overslam. If the door is slammed shut, it can cause the arm to pivot too much with respect to the gage body, resulting in error with the seal gap measurement. Thus, it is desirable to have a seal gap system where multiple gages can easily and quickly be placed about a weld flange such that simultaneous seal gap measurements can be taken. It is also desirable to have a seal gap gage that can correct door and decklid overslam problems.

Another known seal gap gage uses a clothespin style gripping mount to attach the gage to the weld flange. The gages are connected to a fixed overhead device that receives and stores input from the gages. A disadvantage with this system is that the gages and device can not be moved from one location to a different location. Instead, the vehicle must be brought to the gages and the device in order for seal gap measurements to be taken.

Another system mounts multiple gages around the weld flange with connections to a device that receives input from the gages. One disadvantage with this system is that the gage is connected to the device by a wire connection that extends through the door to the exterior of the vehicle. Each time the door is shut to take a measurement, the wire is slammed shut between the door and its mating component. Over a period of time, this can cause the wire to wear and eventually result in error in the seal gap measurements.

Thus, it is desirable to have a gaging system that can take measurements simultaneously at different locations along the weld flange, and which can be moved quickly and efficiently from one location to the next. Also it is desirable to have a system that does not have gage wire connections that are shut in the door each time a measurement is taken.

One disadvantage with all known seal gap gages is the error introduced in the measurement due to the door or decklid not being flush. Seal gap measurements are typically taken before the latches are installed in the door or decklid assembly. Thus, the door or decklid may be out of flush with its respective mating component. This introduces error in the seal gap measurement, which can cause a part to be labeled as being out of a required tolerance range when the part would be in the required range if the door was flush. Thus, it is desirable to have a seal gap gage system that can correct seal gap measurements to take into account the flushness between the door or decklid and its mating component.

SUMMARY OF THE INVENTION AND ADVANTAGES

A system for measuring a gap between a pair of spaced apart opposed surfaces comprises at least one gage assembly that is mountable adjacent to the surfaces. The gage assembly includes a probe that is selectively displaceable relative to the gage assembly based upon gap size. A sensor is used to measure position or displacement of the probe and an actuating mechanism remotely activates the system to measure the gap.

In one embodiment a portable computer or processor unit is used to receive and store electronic signals produced by each of the gage assemblies. The electronic signals are indicative of gap size.

In another embodiment, an adapter assembly is removably mounted to the gage body for providing extended support for the probe to measure larger gap sizes.

In another embodiment, a probe member is adjustable with respect to one of the surfaces. The probe member is movable in a first direction when a gap measurement is taken. The gage includes an abutment surface that engages one of the surfaces. The abutment surface is generally parallel to the first direction and the probe member and the abutment surface are selectively adjustable relative to each other in a direction transverse to the first direction.

The gaging system is easily transported from one location to the next by using a portable carrying apparatus to carry the gages. The apparatus includes a central body member, a first rail supported on one side of the body member, and a second rail supported on an opposite side of the body member. The first and second rails each include a mounting surface for supporting at least one gage assembly. A handle extends upwardly from the body portion for grasping the apparatus to move it from first location to a second location.

In one embodiment, a method for measuring a true seal gap between a vehicle door and a vehicle doorway frame member is used for taking into account variations in door flushness conditions. The method includes the following steps: (a) measuring flushness between the vehicle door and the vehicle doorway frame member; (b) measuring the seal gap between the vehicle door and the vehicle doorway frame member; (c) determining the difference between measured flushness and ideal flushness; (d) correcting the measured seal gap based on the difference between measured and ideal flushness.

The subject invention offers a portable seal gap gage system that is easily installed on a vehicle and which can quickly be moved from one vehicle to the next, or can be moved from one manufacturing facility to another. The system can simultaneously make multiple seal gap measurements at different locations about a door flange, which are stored within a processor. The system also corrects error that is introduced into seal gap measurements by door overslam and doors or decklids being out of flush with their mating components.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a schematic view of a remote activation system;

FIG. 6 is a side view of a door seal gap gage;

FIG. 7 is a side view, partially cut away, of the gage shown in FIG. 6 with a height adapter assembly;

FIG. 8 is a top view of the gage shown in FIG. 7;

DETAILED DESCRIPTION OF THE PREFERRED EMBODIMENT

Figure 1:
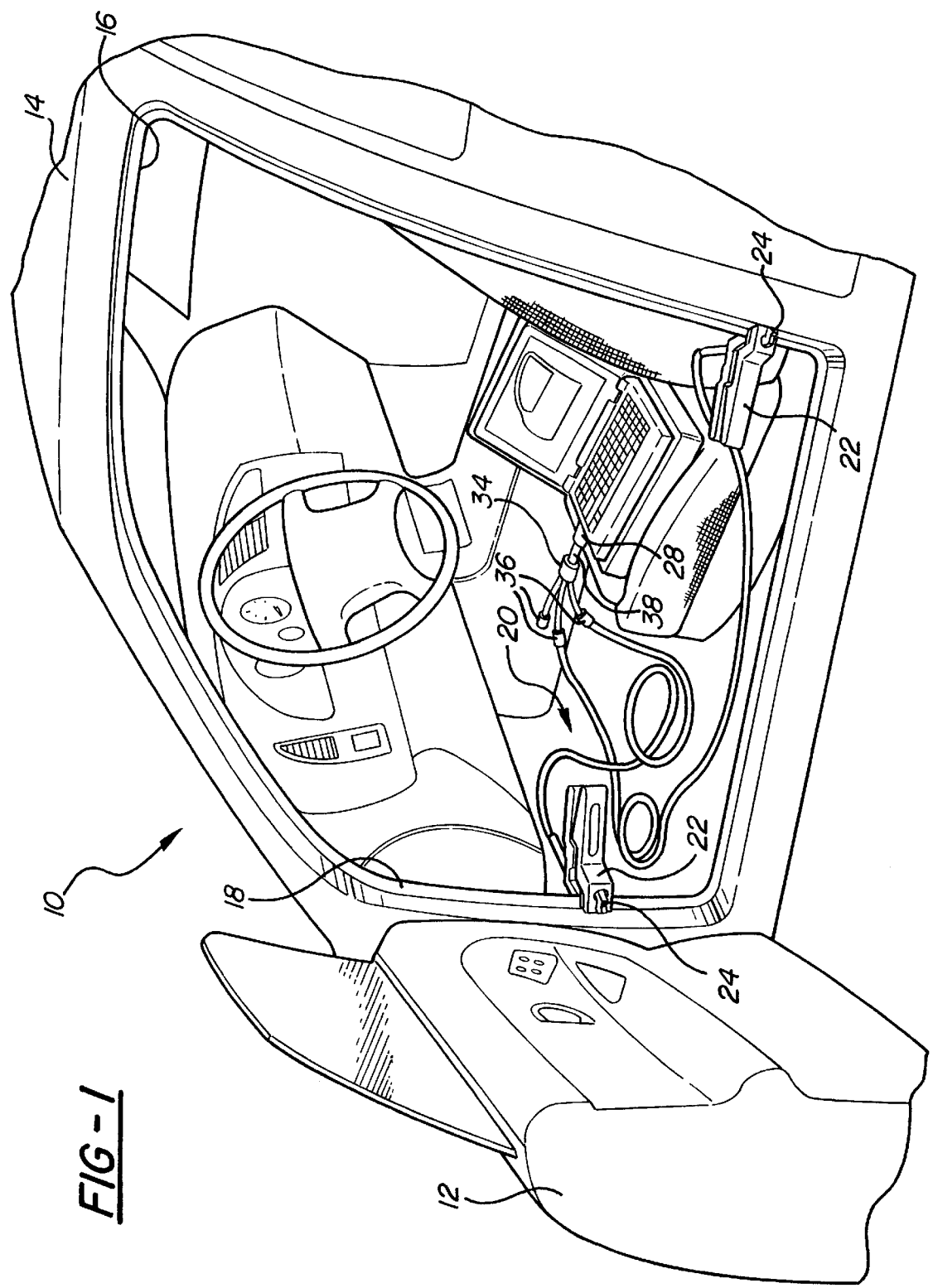
FIG. 1 is a perspective view, partially cut-away, of the inventive portable seal gap gage system measuring a vehicle door seal gap.

Referring to the Figures, wherein like numerals indicate like or corresponding parts throughout the several views, a vehicle is shown generally at 10 in FIG. 1. A gaging system 20 for measuring a gap between a pair of spaced apart opposed surfaces is used to measure a seal gap between a flange surrounding a vehicle door opening and the opening's mating component. The seal gap measurement is taken to verify that there is proper compression on the seal, when installed, to reduce wind noise and prevent water leakage. The vehicle door opening can be any of the various doors in the car including a driver's door, a passenger door, a hood, a rear hatch door, or a trunk. The system can be used to take seal gap measurements solely at the door, solely at the decklid, or can simultaneously take measurements at both the door and decklid.

Figure 4:
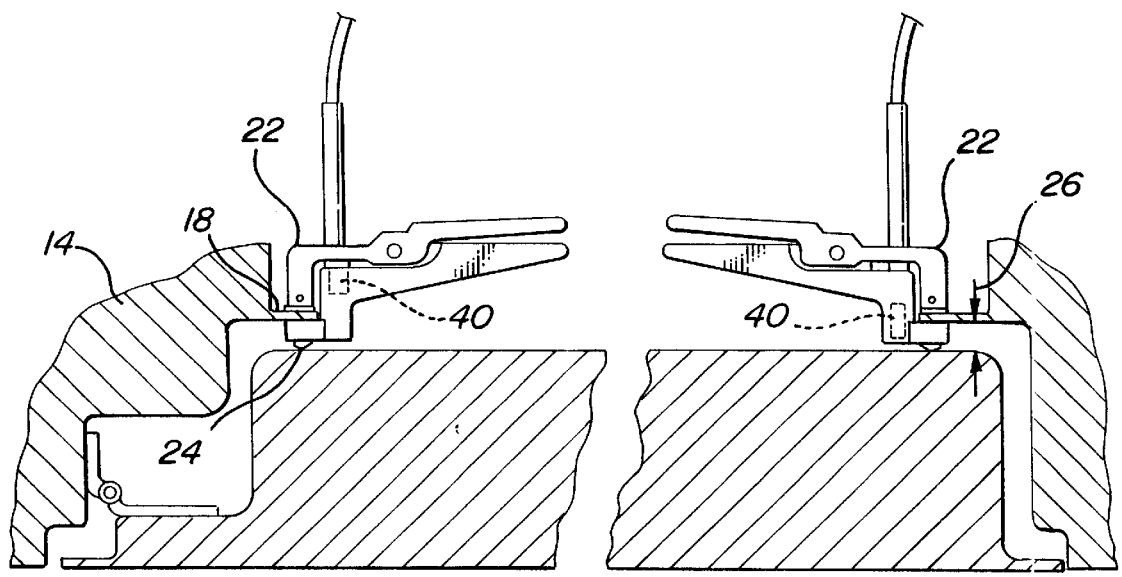
FIG. 4 is the gaging system of FIG. 1 with the vehicle door in a closed position.

A vehicle driver's door 12 is shown in FIG. 1. The door 12 moves between an open position and a closed position to allow occupants to access the vehicle interior. In the closed position the door is sealed against a vehicle body 14 to prevent wind, rain, snow, and other contaminants from entering the interior of the vehicle. The vehicle body 14 has an opening 16 that generally corresponds in shape to the door 12. The opening 16 is surrounded by a door weld flange 18. A seal gap 26, shown in FIG. 4, is defined between the door 12 and the door flange 18 when the door 12 is in the closed position. A seal (not shown) is eventually installed in the seal gap 26 between the flange 18 and door 12 to keep out water and reduce wind noise. Before the seal is installed, the gaging system 20 is used to measure the seal gap 26 at various positions on the flange 18 about the perimeter of the doorway opening 16 to ensure that the seal gap 26 is within acceptable tolerance ranges.

The gaging system 20 includes at least one gage assembly 22 that is mountable adjacent to the door 12 and door flange 18. The gage assembly 22 includes a probe tip or member 24 that is selectively displaceable relative to the gage assembly 22 based upon gap size. Only two (2) gage assemblies 22 are shown in FIG. 1, but any number of gages 22 can be used with the system 20 to measure the seal gap at a variety of positions along the door flange 18.

A processor or portable computer 28 is connected to each of the gages 22 to receive and store data transmitted by each of the gages 22. The processor 28 can be any of various known processing or computing devices in the art. The processor 28 and gages 22 are easily moved from one vehicle to the next or from one manufacturing facility to the next. Thus, the portability of the system allows the gages 22 and processor 28 to be easily moved to various locations without requiring time consuming assembly and disassembly of components.

Figure 2:
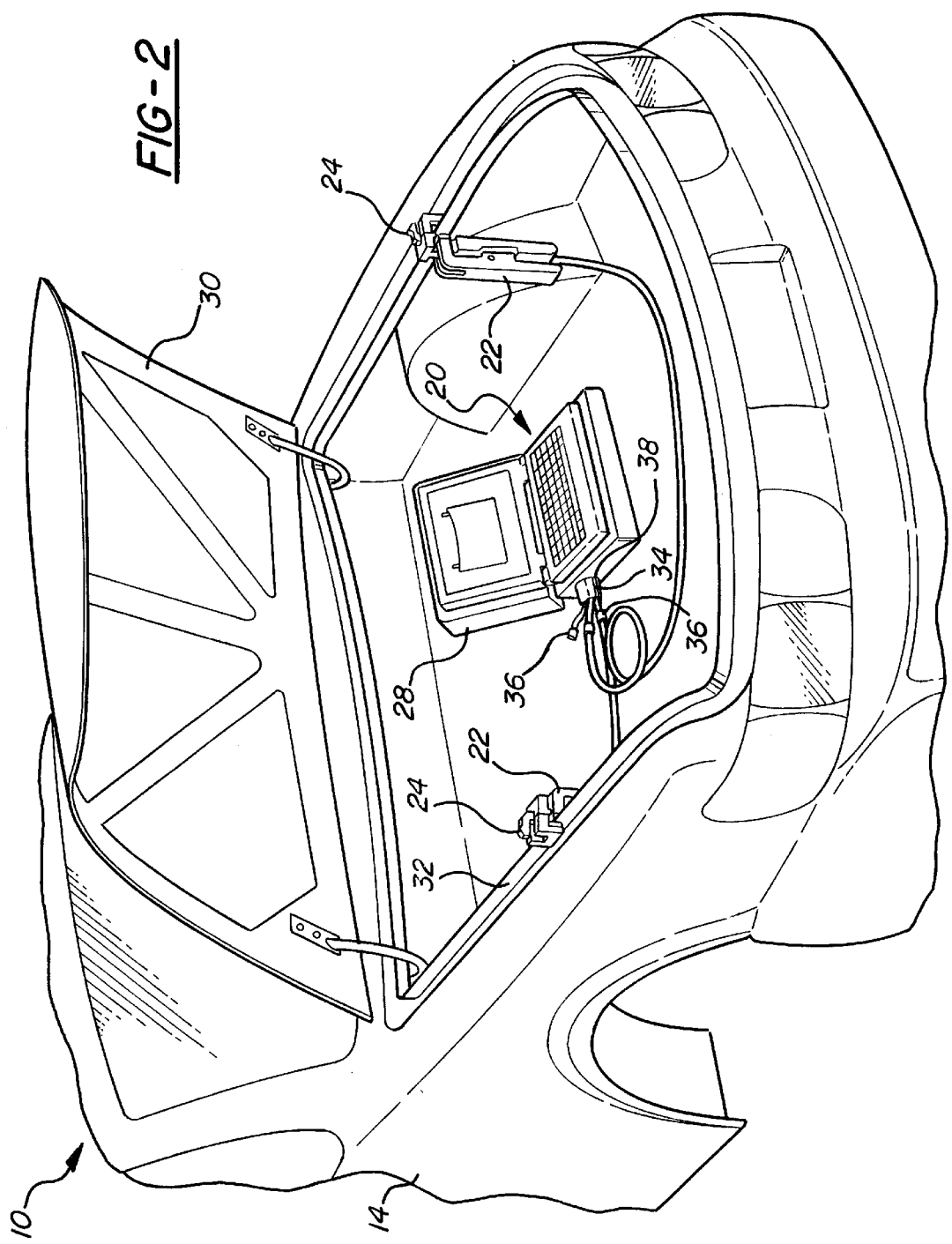
FIG. 2 is a perspective view, partially cut-away, of the inventive portable seal gap gage system measuring a vehicle decklid seal gap.

FIG. 2 shows the gaging system 20 as it is used to measure a seal gap 26 between a decklid 30 and a trunk flange 32. Any number of the gages 22 are supported on the trunk flange 32 and are connected to the processor 28. The processor 28 preferably has a pigtail connector 34 with a plurality of ports 36 on one side of the connector 34 and a single processor port 38 on another side of the connector 34. This pigtail 34 allows all of the gages 22 to be quickly disconnected from the processor 28 at the same time so that the gaging system 20 can be easily and quickly moved to the next vehicle. Also, the number of gages 22 that are connected to the pigtail connector 34 can be varied depending on the application. Another advantages with using the pigtail connector 34 is that if one gage 22 fails, another gage 22 can quickly be connected to another port 36.

Figure 3:
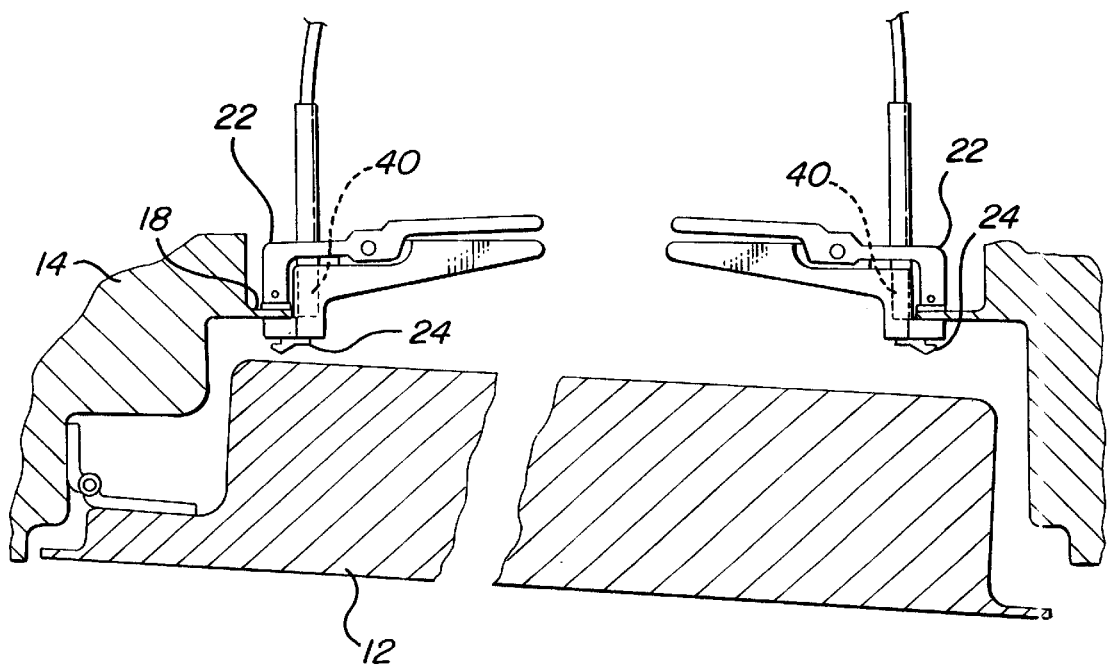
FIG. 3 is the gaging system of FIG. 1 with the vehicle door in an open position.

The gage assemblies 22 are shown in more detail in FIGS. 3 and 4. FIG. 3 shows the gages 22 installed on the flange 18 before the door 12 is moved to the closed position and FIG. 4 shows the gages 22 after the door 12 has been closed. Each of the gages includes a sensor 40, shown schematically, for measuring position or displacement of the probe tip or member 24. The sensor can be of any sensors known in the art, such as a transducer, for example. The sensor 40 can be used to measure either the change in displacement of the probe member 24 from a first position to a second position, or the sensor 40 can measure the position of the probe member 24 from a reference surface as will be discussed in greater detail below. The sensor 40 makes this measurement and converts it to an electrical signal indicative of seal gap size 26 and sends the signal to the processor 28.

The system 20 also includes an actuating mechanism 42, shown in FIG. 5, for remotely activating the system 20 to measure the gap 26. Remote activation allows the system 20 to be mounted to the flange 18 with wire connections extending to the processor 28 sitting within the vehicle 10. There are no wire connections extending through the door 12 to an activating device or computer. The system 20 is installed within the vehicle interior. The actuating mechanism 42 sends a wireless activation signal from a location remote from the gage 22 to the system 20 to initiate simultaneous gap measurements at each of the gages 22. This allows quick and efficient seal gap measurements to be taken.

The system 20 can also include a recorder or storage device for recording and storing measurements taken in response to remote actuation by the actuating mechanism 42. In the preferred embodiment, the recorder device is the portable processor 28 which includes software for displaying the real time measurements with or without part graphics along with storing the data.

Figure 10:
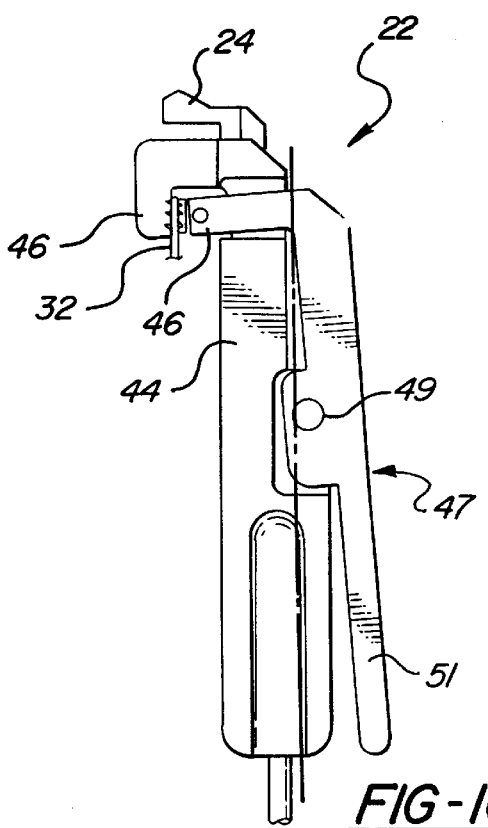
FIG. 10 is a side view of an alternate embodiment of a seal gap gage used for a decklid.

The gage 22 can be of various configurations. An example of a configuration that is used to measure the seal gap 26 between a door flange 18 and a door 12 is shown in FIGS. 1 and 6. Another example of a gage configuration used to measure the seal gap 26 between a decklid 30 and a flange 32 is shown in FIGS. 2 and 10.

In both configurations, each of the gages 22 includes gage body 44 and a pair of opposing jaws 46 for gripping the flange 18 or 32 to hold the gage 22 fixed with respect to the flange 18 or 32. The gages 22 further include a lever portion 47 and a head portion 48 extending from the gage body 44 with a reference surface 50 that supports the probe member 24. The leveer portion 47 is pivotally engaged with the gage body 44 via primary pivot fastener 49 for opening the jaws 46 upon manipulation of a handle 51 of the end lever portion 47. The opposing jaws 46 are resiliently biasable into gripping engagement the flanges 18, 32 in both configurations. At least one of the jaws 46 is pivotable with respect to the gage body 44 to account for surface irregularities on the flange 18. In the preferred embodiment, the head portion 48 is integrally formed on one of the jaws 46. The jaws 46 preferably include a ridged surface 66 to improve gripping capability.

As discussed above, the sensor 40 can measure either the displacement of the probe member 24 as it moves from an unactuated position when the door 12 is open to an actuated position when the door 12 is closed, or the sensor 40 can measure the position of the probe member 24 with respect to the reference surface 50.

In the configuration shown in FIG. 6, the gage assembly 22 defines a longitudinal axis 52 and probe 24 is moveable with respect to the head portion 48 in a direction that is transverse to the longitudinal axis 52. In the configuration shown in FIG. 10, the probe 24 is moveable with respect to the head portion 48 in a direction that is generally parallel to the longitudinal axis 52.

A method for measuring the gap 26 between the flange 18 or 32 and the door 12 or decklid 30 includes the steps of supporting at least one gage assembly 22 with the probe member 24 adjacent to flanges 18 or 32, contacting the probe member 24 against the opposing surface, i.e. the door 12 or decklid 30 when moved to the closed position and remotely initiating measurement of the gap 26. Additional steps include connecting each of the gage assemblies 22 to one of a plurality of connection ports 36 on one side of the connector 34, connecting the portable processor 28 to a single processor port 38 on another side of the connector 34, and producing an electronic signal for each gage assembly 22 indicative of gap size that is transmitted to and received by the processor 28.

Figure 9:
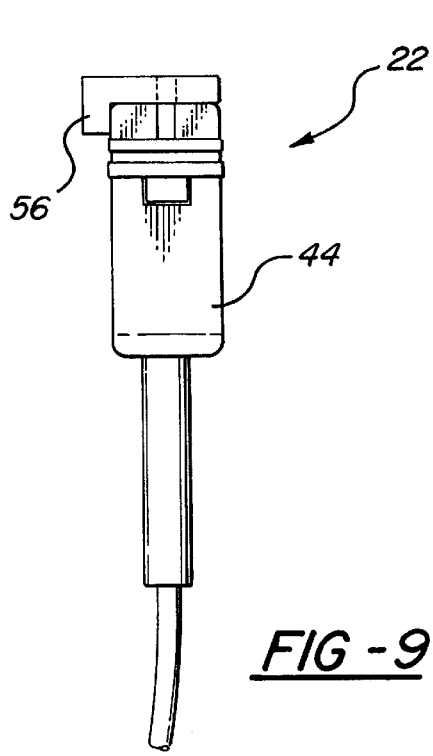
FIG. 9 is a front view of the gage shown in FIG. 7.

Each of the configurations also has the capability of measuring a wide range of gap sizes by using adapter assemblies. In the door 12 configuration, an adapter assembly 54, shown in FIGS. 7–9, is mounted to the gage assembly 22 to provide extended support for the probe 24 to measure larger gap sizes. In the preferred embodiment, the adapter assembly 54 includes an adapter block 56 that is removably mounted to the gage body 44 and a probe extension 58 that is removably mounted to the probe 24. At least one threaded fastener 60 is used to attach the adapter block 56 to the gage 22. A fastener 62 is also used to attach the probe extension 58 to the probe 24. Various adapter assemblies 54 of different sizes can be used to provide extended support for the probe 24 to measure larger gap sizes.

Figure 11:
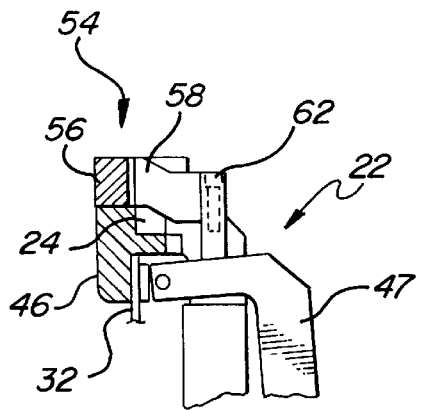
FIG. 11 is a side view, partially cut-away, of the gage shown in FIG. 10 with a height adapter assembly.
Figure 12:
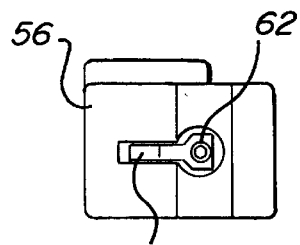
FIG. 12 is a top view of the gage shown in FIG. 11.
Figure 13:
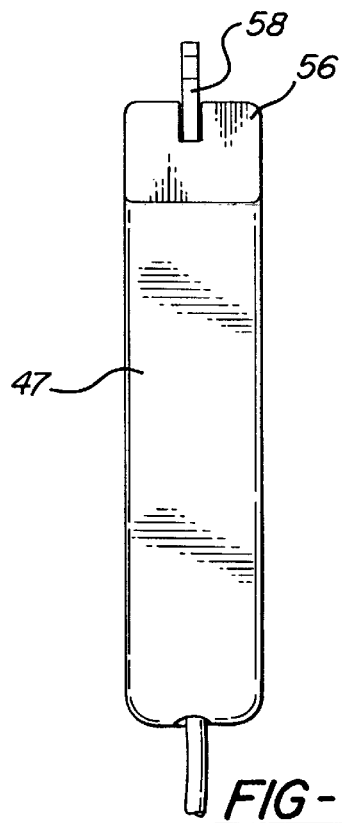
FIG. 13 is a front view of the gage shown in FIG. 11.

A similar adapter assembly 54, shown in FIGS. 11–13, is mounted to the trunk gage configuration. An adapter block 56 is removably mounted to the gage body 44 and a probe extension 58 is removably mounted to the probe 24.

The method of using a single gage assembly 22 for measuring a wide range of gap sizes between flanges 18, or 32 and the door 12 or decklid 30 includes the following steps. A first pre-determined gap range is established having a first maximum measurable distance and a first minimum measurable between the flange 18 and door 12 in the closed position. A second pre-determined gap range is selectively established that has a second maximum measurable distance and a second minimum measurable distance between the door 12 and flange 18 where the second maximum and minimum measurable distances are greater than the first maximum and minimum measurable distances, respectively. The second pre-determined gap range can be broken down into a plurality of pre-determined gap ranges that are all greater than the first predetermined gap range, with each successive range being greater than the previous range. A plurality of adapter assemblies 54 are provided for each of the plurality of pre-determined gap ranges. A system operator determines the approximate gap range between the door 12 and the flange 18 and selects an adapter assembly corresponding to the approximate gap range.

The selected adapter assembly 54 is mounted to the gage assembly 22 allow the gage assembly 22 to measure gaps 26 falling in the second pre-determined gap range. The gage 22 is then mounted adjacent to the door 12 and flange 18, and the gap 26 is measured. The adapter assembly 54 is removed for measuring a gap 26 that falls in the first pre-determined gap range.

Figure 14:
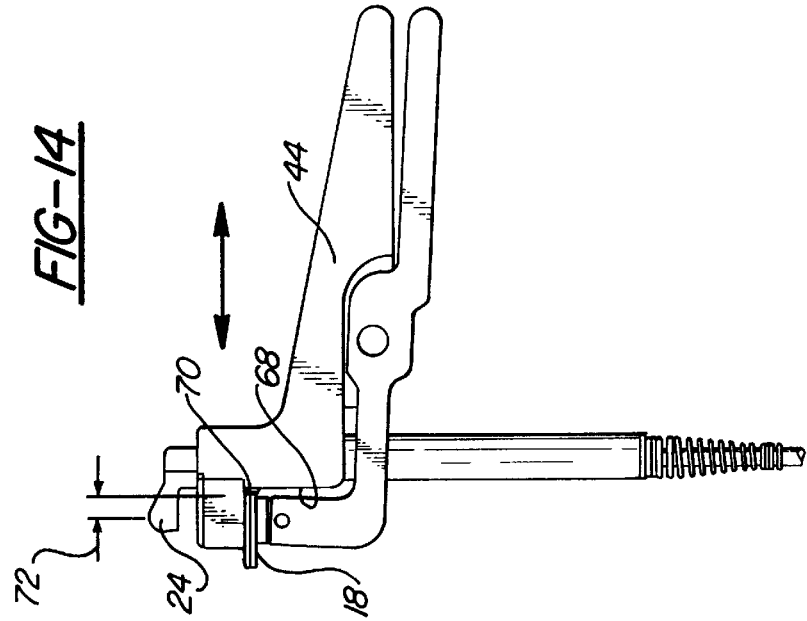
FIG. 14 is a side view showing an embodiment of the gage having an adjustment member for positioning a probe member.

The probe 24 on the gage assemblies 22 also has an optional adjustment capability, shown in FIG. 14, for adjusting the position of the probe in a direction transverse to the movement of the probe 24 when the gage 22 is measuring a seal gap 26. The probe member 24 is selectively displaceable in a first direction relative to the gage body 44, specifically relative to one of the jaws 46, based upon gap size. An abutment surface 68 on the gage body 44 engages one of the surfaces, i.e. the door 12 or the flange 18. The abutment surface 68 is generally parallel to the first direction. The probe 24 and the abutment surface 68 are selectively adjustable relative to each other in a direction transverse to the first direction. An adjustment mechanism 70 is supported on the gage body 44 and includes a component moveable with respect to the gage body 44 that defines the abutment surface 68. The component of the adjustment mechanism 70 is preferably at least one set screw that is adjustable between a maximum and minimum position. Adjusting the set screw adjusts the position of the probe between a range 72 having a maximum and minimum position.

The method of using the gage assembly 22 with an adjustable probe member 24 includes the following steps. The gage assembly 22 is provided with a gage body 44 having a probe member 24 that is selectively displaceable in a first direction relative to the gage body 44. The position of the probe member 24 is selectively adjusted in a second direction transverse to the first direction to provide a consistent contact point along one of the surfaces, either the door 12 or flange 18. The gage assembly 22 is mounted adjacent to the door 12 and flange 18 and the gap is measured. The probe member 24 is preferably supported with respect to the reference surface 50 on the gage body 44 and the adjustment mechanism 70 is supported on the abutment surface 68 of the gage body 44. The set screw component of the adjustment mechanism 70 is selectively moved to control the position of the probe member 24 with respect to the surface against which the probe member 24 will be contacted.

When the jaws 46 of the gage 22 are gripped on the flange 18, it is important that the abutment surface 68 is seated firmly against the flange 18. This will insure that the contact point on the door 12 is consistent at the various locations about the perimeter of the door opening 16.

While the adapter assembly 54 and adjustment mechanism 70 have been described in detail with regard to the gage 22 used for measuring a door seal gap 26, it should be understood that the adapter assembly 54 and adjustment mechanism 70 can also be used on other gage assemblies.

A transport apparatus 80 is used to move the gage assemblies 22 from vehicle to vehicle. The transport apparatus 80 includes a central body member 82, a first rail 84 supported on one side 86 of the body member 82, and a second rail 88 supported on an opposite side 90 of the body member 82. The first 84 and second 88 rails can integrally molded as one piece or can be made as separated pieces that are joined together by means well known in the art. Or, the rails 84, 88 can include mounts such that the rails 84, 88 can be selectively removed from the central body member 82.

The first 84 and second 88 rails each including a mounting surface 92 for supporting at least one gage assembly 22. The transport apparatus 80 also includes a transporting member 94 that is used to move the central body member 82, rails 84, 88, and gages 22 from a first location to a second location. The transporting member 94 can be a handle 94, as shown, or can be any other known means in the art to move the gages from location to location. For example, the transporting member 94 could be a cart having wheels and a push bar.

Figure 15A:
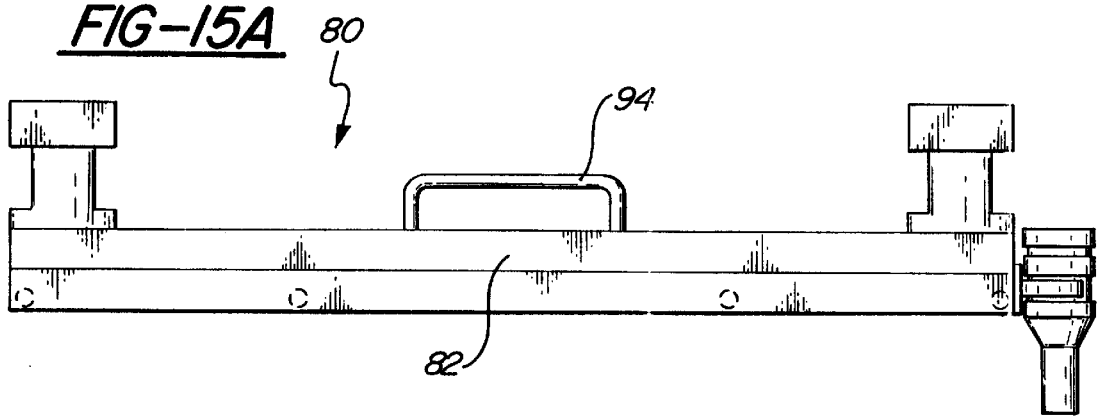
FIG. 15A is an end view of one embodiment of a carrying apparatus for supporting gage assemblies.
Figure 15B:
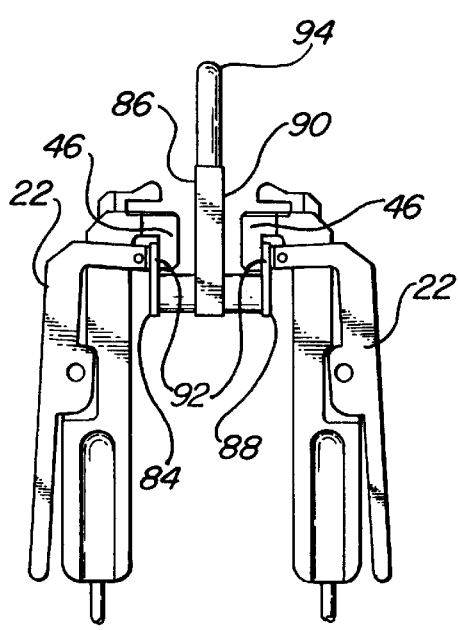
FIG. 15B is a side view of the carrying apparatus shown in FIG. 15A.

The carrying apparatus 80 can be constructed with varying configurations. An example of one configuration, shown in FIGS. 15A and 15B, is used for moving door seal gap gages 22. In this configuration, the first 84 and second 88 rails are vertically oriented with respect to the central body member 82. Thus, the mounting surfaces 92 along the rails 84, 88 are also vertically oriented.

Figure 16A:
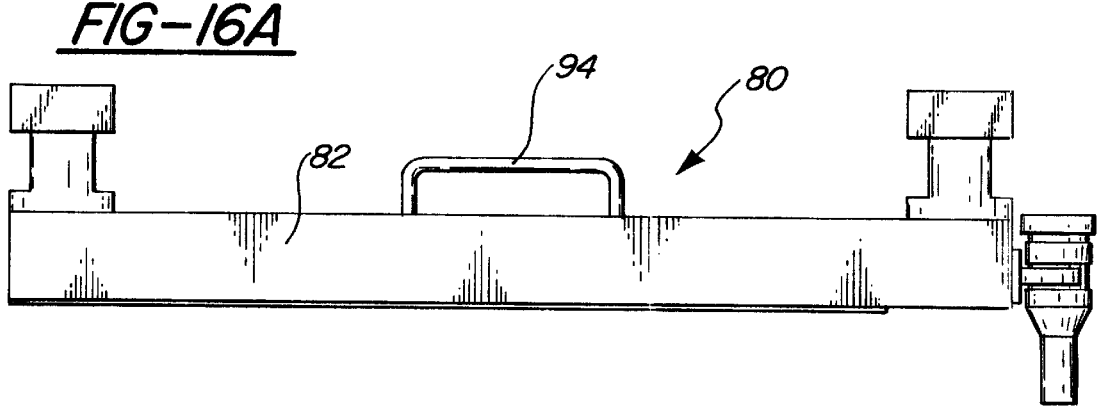
FIG. 16A is an end view of another embodiment of a carrying apparatus for supporting gage assemblies.
Figure 16B:
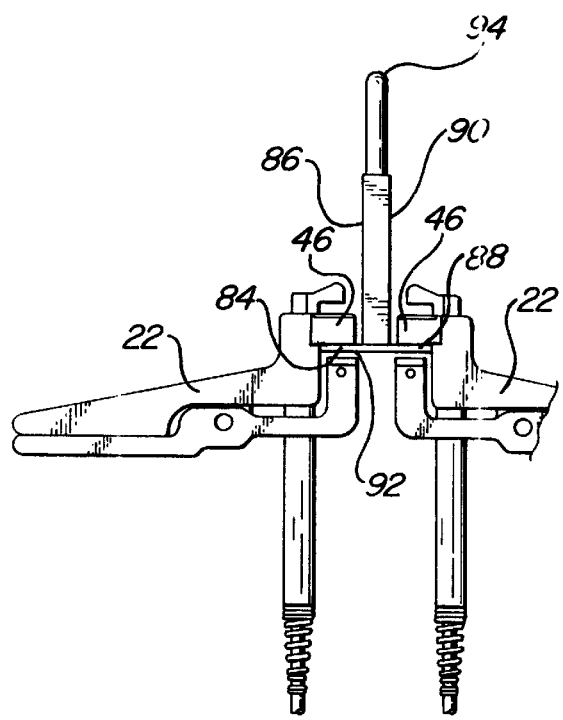
FIG. 16B is a side view of the carrying apparatus shown in FIG. 16A.
Figure 18:
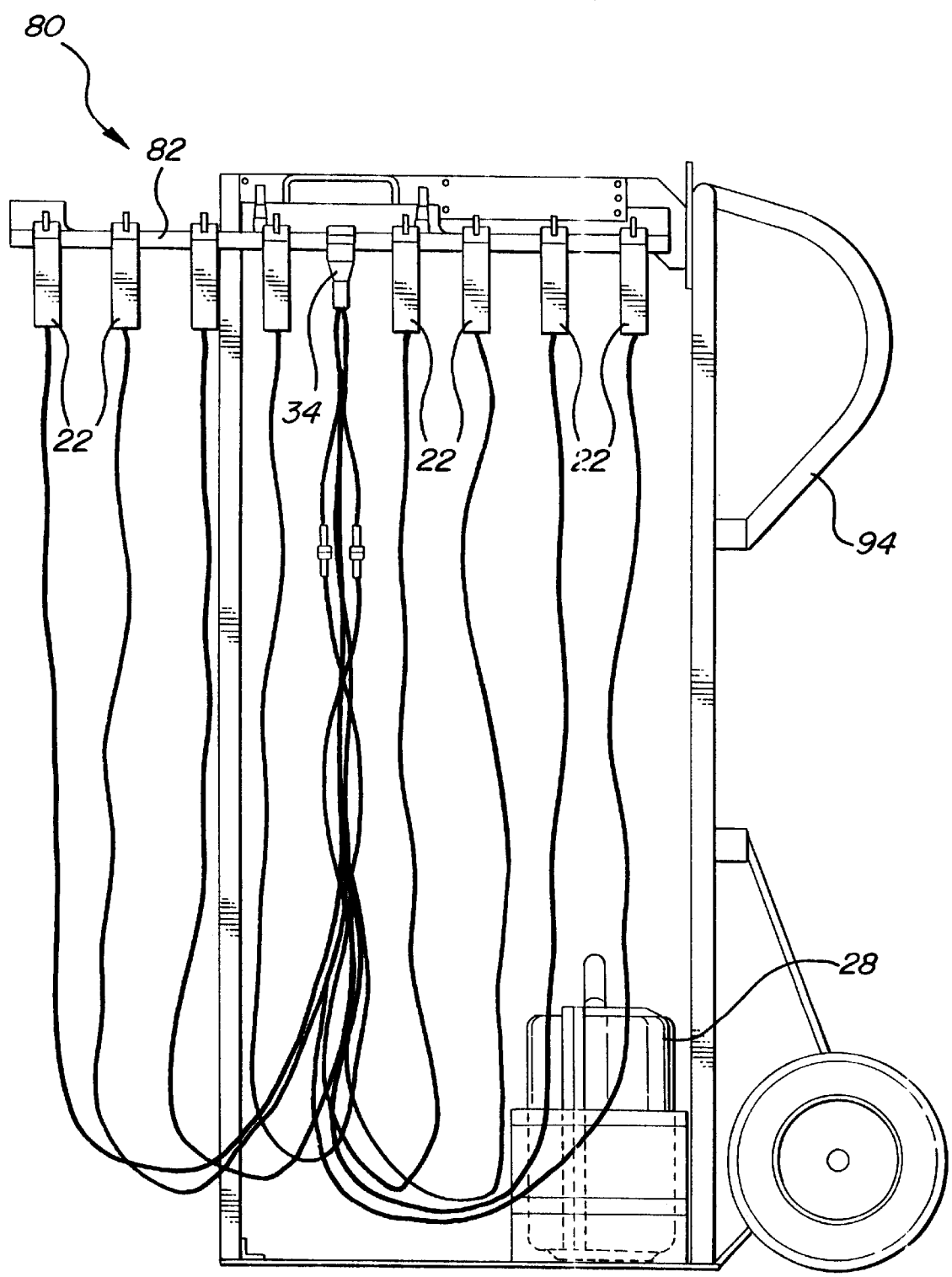
FIG. 18 is a side view of an alternate embodiment of the carrying apparatus.

Another example of a portable carrying apparatus 80 is shown in FIGS. 16A and 16B. In this configuration, the first 84 and second 88 rails are horizontally orientated with respect to the central body member 82. Thus, the mounting surfaces 92 along the rails 84, 88 are also horizontally oriented. In both configurations, the rails 84, 88 extend substantially along the length of the body member 82.

The portable carrying apparatus 80 is capable of supporting a multitude of gage assemblies 22 along the first 84 and second 88 rails. The resiliently biasable gripping jaws 46 are released from the flange 18 or 32 and are quickly mounted to the mounting surfaces 92 along the rails 84, 88. The carrying apparatus 80 is then lifted at its handle 94 and is moved from the current vehicle to the next vehicle.

The ideal seal gap measurements are intended to be taken when the door 12 is in the closed position with the door 12 or decklid 30 being flush with its respective mating component. One disadvantage with all known seal gap gages is the error introduced in the measurement due to the door or decklid not being flush. The door or decklid may be out of flush with its respective mating component. This introduces error in the seal gap measurement, which can cause a part to be labeled as being out of a required tolerance range when the part would be in the required range if the door was flush.

Figure 17:
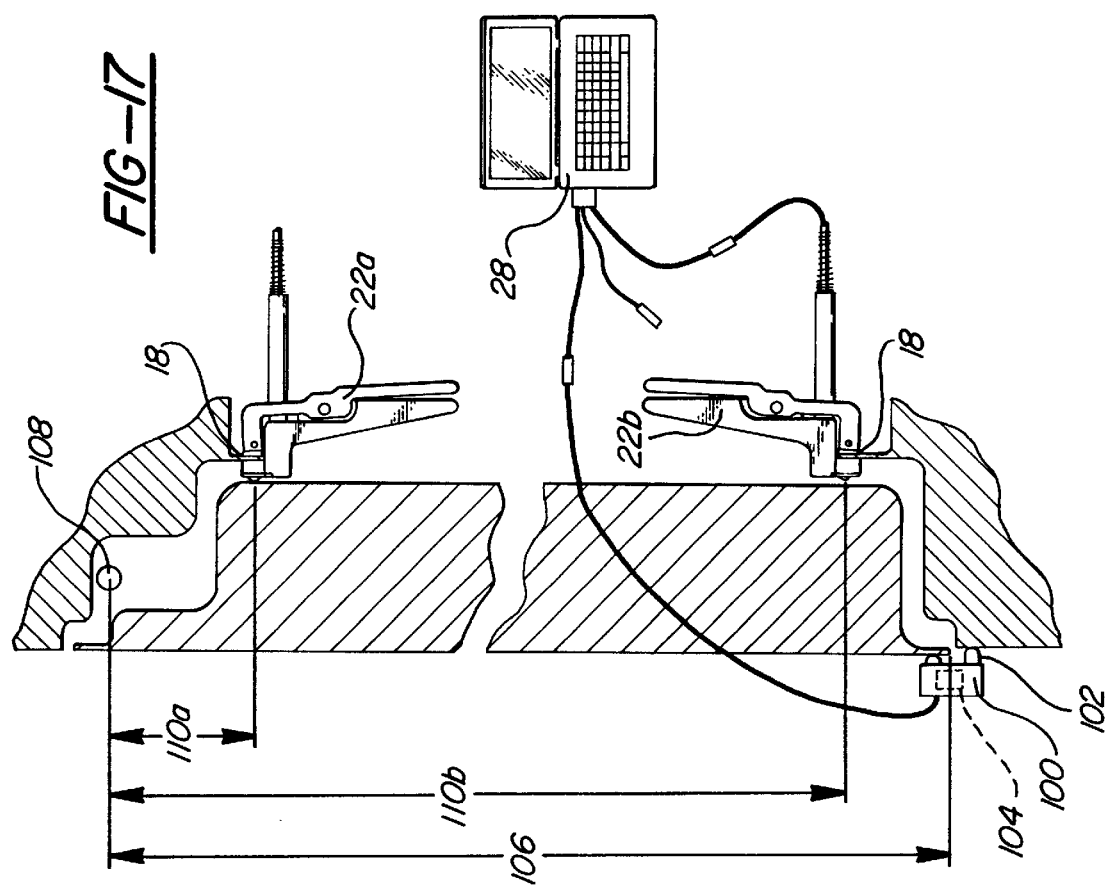
FIG. 17 is a schematic view showing the flush compensation system.

A method for measuring a true seal gap 26 between a vehicle door 12 and a vehicle doorway frame member 18 taking into account variations in door flushness conditions includes the following steps. Flushness is measured with a flush gage 100, shown schematically in FIG. 17, between the outer surface of the door or decklid with respect to its mating component, such as a quarter panel or fender, for example. The seal gap 26 is measured by a seal gap gage 22 between the vehicle door 12 and the flange 18. A computer or other processor 28 is used to determine the difference between measured flushness and ideal flushness. The measured seal gap 26 is then corrected based on the difference between measured and ideal flushness. This is discussed in greater detail below.

The flush gage 100 includes a flush probe 102 that is selectively displaceable relative to the flush gage 100. The flush gage 100 includes a sensor 104 that measures either the displacement of the flush probe 102 or the position of the flush probe 102 with respect to a reference surface on the gage 100.

To correct the seal gap measurement for a door that is out of flush the angle that the door 12 is rotated from nominal must be determined. To determined this angle, the distance 106 between the flush check point and vehicle door hinge 108 is measured. The angle that the door 12 is rotated from nominal flush is calculated by taking the inverse tangent of the flush reading from the gage 100 divided by the distance 106 between the hinge 108 and flush check point. For example if the flush gage 100 reads that the door is out of flush by 0.11811 inches (three (3) millimeters) and the distance between the hinge 108 and the flush check point is forty (40) inches, then the angle is equal to $\tan^{-1}$ (0.11811/40), which equals 0.16918 degrees.

Once this angle has been determined, it is used to correct the seal gap measurements at each of the gages 22 located about the perimeter of the doorway 16. To correct the seal gap measurement taken by each gage 22, the distance 110 from the hinge 108 to the respective seal gap gage 22 must be known. In the example shown, two (2) seal gap gages 22 are mounted to two different locations on the door flange 18. One seal gap gage 22a is located at a distance 110a from the hinge 108 and a second seal gap gage 22b is located a second distance 110b from the hinge 108 where the second distance 110b is greater than the first distance 110a. The further the seal gap gage 22 is located from the hinge 108, the more the seal gap measurement is affected by flush error.

For example, if the first seal gap gage 22a is located at a first distance 110a of three (3) inches then the correction factor is 0.00886 inches, which should be added or subtracted to the seal gap measurement made by that gage 22a depending upon which direction the door 12 is rotated out of flush. The correction factor is determined by taking the tangent of the angle that the door is out of flush and multiplying it by the distance 110a. Thus, the correction factor 0.00886 equals (–(3)tan(0.16918 degrees)).

If the second seal gap gage 22b is located at a second distance 110b of thirty eight (38) inches then the correction factor is 0.11220 inches, which should be added or subtracted to the seal gap measurement made by that gage 22b depending upon which direction the door 12 is rotated out of flush. The correction factor is determined by using the equation (–(38)tan(0.16918 degrees)), which equals 0.11220 inches. Note that the readings are added or subtracted based on a "+" or "–" reading from flush, which would therefore give a "+" or "–" angle, which would identify the direction the door had moved. This would then give you a "+" or "–" correction factor that is added to the reading.

While the above example is discussed using only two seal gap gages 22, it should be understood that the method could be used with a single seal gap gage 22 or more than two seal gap gages. The only requirement is that the distance from the hinge 108 to the seal gap gage check point be known.

The flush distance 106 and the seal gap distance 110 can be preprogrammed into the processor 28 or can be measured separately and entered in to the processor 28 for each vehicle. Preferably, the flush gage 100 can be mounted at the same location on the door for every vehicle so that the distance 106 can be programmed into the processor 28. The seal gap gages 22 could also be placed at the same check points about the doorway 16 so that the distances 110 could be pre-programmed into the processor 28.

Correcting seal gap measurements for out of flushness reduces part scrap and or decreases door adjustment time by providing a more accurate seal gap reading. Thus, parts that were determined to have unacceptable seal gaps 26, i.e. seal gaps 26 that were out of the desired tolerance range, are shown to be good parts, i.e. having seal gaps 26 that meet tolerance requirements, but for the door being out of flush.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A system for measuring a gap between a pair of spaced apart opposed surfaces, said system comprising:
   at least one gage assembly adapted to be mounted adjacent to the surfaces, said gage assembly including;
   a gage body,
   a head portion extending from said gage body,
   a pair of opposing jaws adapted to grip one of the surfaces such that said gage assembly remains fixed relative to one of the surfaces, and
   a probe supported by said head portion and being selectively displaceable relative to said pair of opposing jaws based upon gap size;
   an adapter assembly mounted to said gage assembly, said adapter assembly including an adapter block mounted to said gage body and a probe extension mounted to said probe for providing extended support for said probe to measure larger gap sizes;
   a sensor for measuring position or displacement of said probe and said probe extension relative to said pair of opposing jaws; and
   an actuating mechanism for remotely activating the system to measure the gap.

2. A system as set forth in claim 1 wherein said adapter block is removably mounted to said gage body and said probe extension is removably mounted to said probe.

3. A method for measuring a true seal gap between a vehicle door and a vehicle doorway frame member taking into account variations in door flushness conditions comprising the steps of:
   (a) measuring flushness between the vehicle door and the vehicle doorway frame member;
   (b) measuring the seal gap between the vehicle door and the vehicle doorway frame member;
   (c) determining the difference between measured flushness and ideal flushness;
   (d) correcting the measured seal gap based on the difference between measured and ideal flushness.

4. A method as recited in claim 3 further including the steps of:
   mounting a flush gage with a flush probe adjacent to the vehicle door or doorway where the flush probe is selectively displaceable relative to the flush gage,
   measuring the displacement of the flush probe,
   measuring the distance between the flush probe and a vehicle door hinge, and
   determining an angle at which the vehicle door is rotated from ideal flushness.

5. A method as recited in claim 4 further including the steps of:
   mounting a seal gap gage with a gap probe adjacent to the vehicle door or doorway wherein the gap probe is selectively displaceable relative to the gap gage,
   measuring the displacement of the gap probe,
   measuring the distance between the gap probe and the vehicle door hinge,
   determining a flush compensation value for the seal gap measurement, and
   correcting the seal gap measurement by the flush compensation value.

6. A system for measuring a gap between a pair of spaced apart opposed surfaces, said system comprising:
   at least one gage assembly adapted to be mounted adjacent to the surfaces, said gage assembly including;
   a gage body,
   a head portion extending from said gage body,
   a pair of opposing jaws adapted to grip one of the surfaces such that said gage assembly remains fixed relative to one of the surfaces,
   a probe supported by said head portion and being selectively displaceable relative to said pair of opposing jaws based upon gap size, and
   a lever portion having a handle end wherein said lever portion supports one of said pair of opposing jaws opposite said handle end and is pivotally engaged with said gage body to open said pair of opposing jaws upon manipulation of said lever portion such that said opposing jaws can grip one of the surfaces for fixing said gage assembly relative to one of the surfaces;

a sensor for measuring position or displacement of said probe relative to said pair of opposing jaws; and an actuating mechanism for remotely activating the system to measure the gap.

7. A system as set forth in claim 6 further including a primary pivot fastener extending through both said gage body and said lever portion such that said lever portion pivots relative to said gage body upon manipulation of said handle end of said lever portion.

8. (Amended). A system for measuring a gap, said system comprising:

a pair of spaced apart opposed surfaces;

at least one gage assembly mounted adjacent to said surfaces, said gage assembly including;

a gage body, a head portion extending from said gage body, a pair of opposing jaws to grip one of said surfaces such that said gage assembly remains fixed relative to one of said surfaces, and a probe supported by said head portion and being selectively displaceable relative to said pair of opposing jaws based upon gap size;

an adapter assembly mounted to said gage assembly, said adapter assembly including an adapter block mounted to said gage body and a probe extension mounted to said probe for providing extended support for said probe to measure larger gap sizes;

a sensor for measuring position or displacement of said probe and said probe extension relative to said pair of opposing jaws; and an actuating mechanism for remotely activating the system to measure the gap.

9. A system as set forth in claim 8 wherein said adapter block is removably mounted to said gage body and said probe extension is removably mounted to said probe.

10. A system for measuring a true seal gap between a vehicle door and a vehicle doorway frame member while taking into account variations in door flushness, said system comprising:

a flush gage having at least one flush probe adapted to be mounted adjacent the vehicle door or doorway frame member, said flush probe being selectively displaceable relative to said flush gage;

at least one gage assembly adapted co be mounted adjacent to the vehicle door or doorway frame member, said gage assembly including;

a gage body, a head portion extending from said gage body, a pair of opposing jaws adapted to grip the vehicle door or doorway frame member such that said gage assembly remains fixed relative to the vehicle door or doorway frame member, a probe supported by said head portion and being selectively displaceable relative to said pair of opposing jaws based upon gap size, and a lever portion having a handle end wherein said lever portion supports one of said pair of opposing jaws opposite said handle end and is pivotally engaged with said gage body to open said pair of opposing jaws upon manipulation of said lever portion such that said opposing jaws can grip the vehicle door or doorway frame member for fixing said gage assembly relative to the vehicle door or doorway frame member;

at least one sensor for measuring position or displacement of said flush probe and position or displacement of said probe of said gage assembly; and an actuating mechanism for remotely activating the system to measure the door flushness and the gap.

11. A system as set forth in claim 10 further including a primary pivot fastener extending through both said gage body and said lever portion such that said lever portion pivots relative to said gage body upon manipulation of said handle end of said lever portion.

12. A system for measuring a gap, said system comprising:

a pair of spaced apart opposed surfaces;

at least one gage assembly mounted adjacent to said surfaces, said gage assembly including;

a gage body, a head portion extending from said gage body, a pair of opposing jaws to grip one of said surfaces such that said gage assembly remains fixed relative to one of said surfaces, a probe supported by said head portion and being selectively displaceable relative to said pair of opposing jaws based upon gap size, and a lever portion having a handle end wherein said lever portion supports one of said pair of opposing jaws opposite said handle end and is pivotally engaged with said gage body to open said pair of opposing jaws upon manipulation of said lever portion such that said opposing jaws can grip one of said surfaces for fixing said gage assembly relative to one of said surfaces;

a sensor for measuring position or displacement of said probe relative to said pair of opposing jaws; and an actuating mechanism for remotely activating the system to measure the gap.

13. A system as set forth in claim 12 further including a primary pivot fastener extending through both said gage body and said lever portion such that said lever portion pivots relative to said gage body upon manipulation of said handle end of said lever portion.

* * * * *